US010561866B1

(12) United States Patent
Hinnant

(10) Patent No.: US 10,561,866 B1
(45) Date of Patent: Feb. 18, 2020

(54) ADJUSTABLE BACK, NECK, AND HEAD SUPPORT FOR FALL ARREST HARNESS

(71) Applicant: Garrett Lee Hinnant, Dade City, FL (US)

(72) Inventor: Garrett Lee Hinnant, Dade City, FL (US)

(*) Notice: Subject to any disclaimer, the term of this patent is extended or adjusted under 35 U.S.C. 154(b) by 0 days.

(21) Appl. No.: 15/725,414

(22) Filed: Oct. 5, 2017

Related U.S. Application Data

(60) Provisional application No. 62/404,451, filed on Oct. 5, 2016.

(51) Int. Cl.
*A62B 35/00* (2006.01)
(52) U.S. Cl.
CPC ................ *A62B 35/0025* (2013.01)
(58) Field of Classification Search
CPC ............ A62B 35/0025; A62B 35/0031; A41D 13/0531; A63B 71/12
USPC .......................................... 182/3; 2/467, 338
See application file for complete search history.

(56) References Cited

U.S. PATENT DOCUMENTS

| | | | | |
|---|---|---|---|---|
| 2,223,276 A * | 11/1940 | Ward | ...................... | A61F 5/055 128/DIG. 23 |
| 2,904,040 A * | 9/1959 | Hale | ...................... | A61F 5/055 128/DIG. 23 |
| 4,628,913 A * | 12/1986 | Lerman | ................... | A61F 5/024 602/18 |
| 5,131,576 A * | 7/1992 | Turnipseed | ............... | A45F 3/08 224/262 |
| 5,531,669 A * | 7/1996 | Varnau | ..................... | A61F 5/055 602/17 |
| 5,632,724 A * | 5/1997 | Lerman | .................... | A61F 5/024 128/845 |
| 5,738,640 A * | 4/1998 | Carlson-Orsi | ............ | A61F 5/01 128/845 |
| 6,039,708 A | 3/2000 | Schaming | | |
| 6,125,966 A | 10/2000 | Jones | | |
| 6,267,741 B1 * | 7/2001 | Lerman | ................... | A61F 5/055 128/DIG. 23 |
| 6,503,213 B2 * | 1/2003 | Bonutti | .................... | A61F 5/055 602/5 |
| 6,790,191 B1 * | 9/2004 | Hendricks | ............... | A61F 5/024 128/102.1 |
| 7,618,385 B2 * | 11/2009 | Poole | ...................... | A61F 5/026 128/DIG. 23 |
| 7,892,193 B2 * | 2/2011 | Marchetto | ............... | A61F 5/055 128/DIG. 23 |
| 8,181,833 B2 * | 5/2012 | Wangeby | .................. | A45F 3/14 224/262 |

(Continued)

FOREIGN PATENT DOCUMENTS

EP 1 803 487 B1 1/2009

*Primary Examiner* — Katherine W Mitchell
*Assistant Examiner* — Shiref M Mekhaeil
(74) *Attorney, Agent, or Firm* — Wendy W. Koba

(57) ABSTRACT

A cushioning apparatus is described for use with a safety harness used to aid in back, neck, and head support. The cushioning apparatus can easily be added to most safety harnesses in use today. The cushioning apparatus comprises a back (and perhaps shoulder) support pad, used in combination with an adjustable head and neck rest. The head rest may also be made to pivot forward and back. The neck rest is preferably attached to the back support pad via a support plate disposed on a rear surface of the back support pad.

11 Claims, 7 Drawing Sheets

(56) References Cited

U.S. PATENT DOCUMENTS

| | | | |
|---|---|---|---|
| 8,333,262 B1* | 12/2012 | Carpenter | A62B 35/0031 182/6 |
| 8,356,604 B2* | 1/2013 | Tweardy | A61F 5/055 128/869 |
| 8,356,692 B1* | 1/2013 | Steck | A62B 35/0025 182/3 |
| 8,584,799 B1 | 11/2013 | Dennington | |
| 8,701,674 B2* | 4/2014 | Tweardy | A61F 5/055 128/869 |
| 9,242,128 B2 | 1/2016 | Macy | |
| 9,332,795 B1* | 5/2016 | Jung | A41D 13/0512 |
| 9,439,462 B2* | 9/2016 | Czajka | A41D 13/1218 |
| 9,480,290 B2* | 11/2016 | Czajka | A41D 13/1209 |
| 9,872,794 B2* | 1/2018 | Ingimundarson | A61F 5/028 |
| 2005/0067221 A1* | 3/2005 | Wolner | A62B 35/0031 182/3 |
| 2010/0193288 A1* | 8/2010 | Colorado | A62B 1/16 182/3 |
| 2010/0200329 A1* | 8/2010 | Johnson | A62B 35/0025 182/3 |
| 2012/0037450 A1* | 2/2012 | Rowland | A62B 35/0025 182/3 |
| 2012/0323154 A1* | 12/2012 | Ingimundarson | A61F 5/01 602/16 |
| 2016/0089554 A1* | 3/2016 | Perner | A62B 35/0006 182/3 |

* cited by examiner

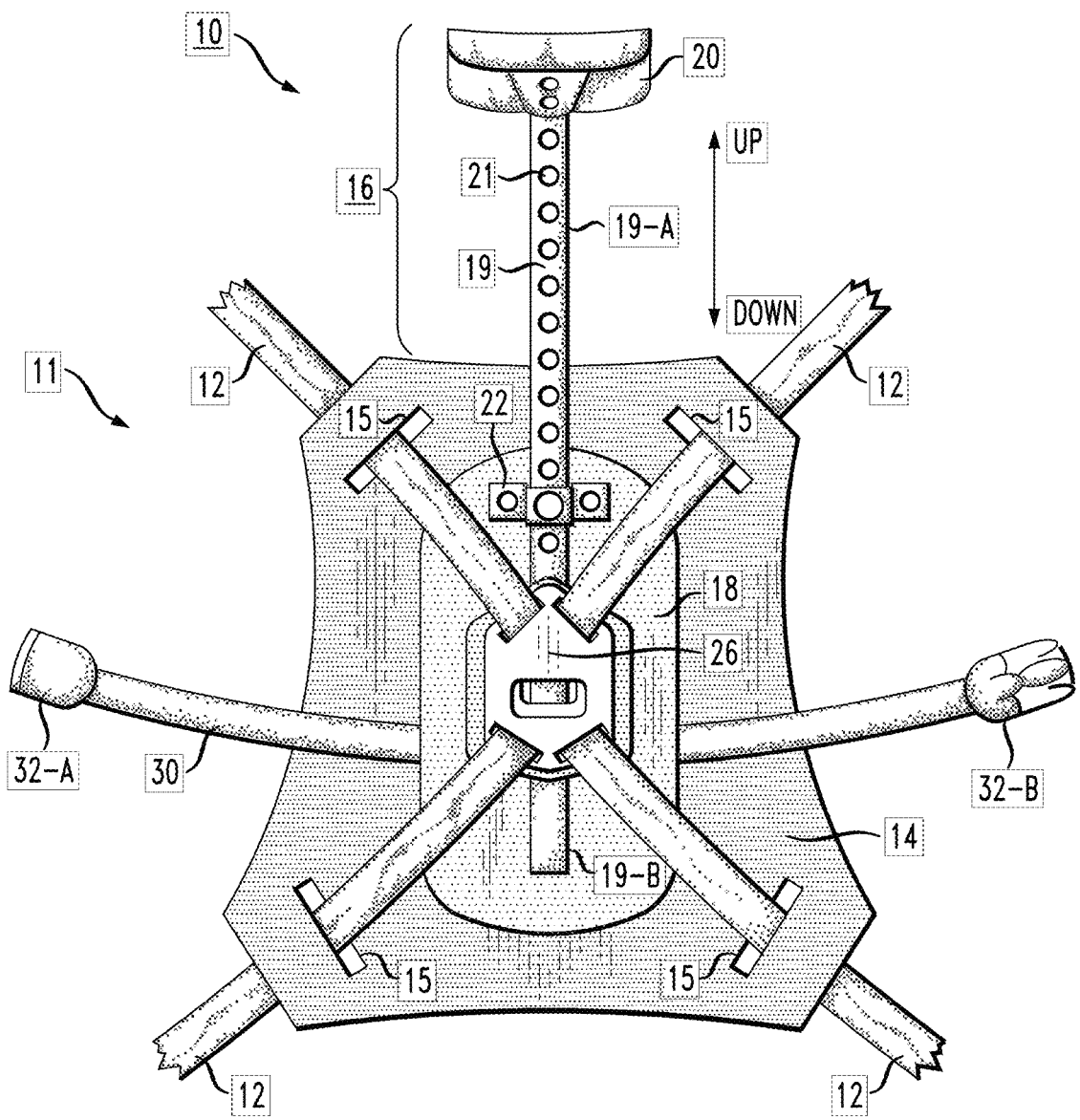

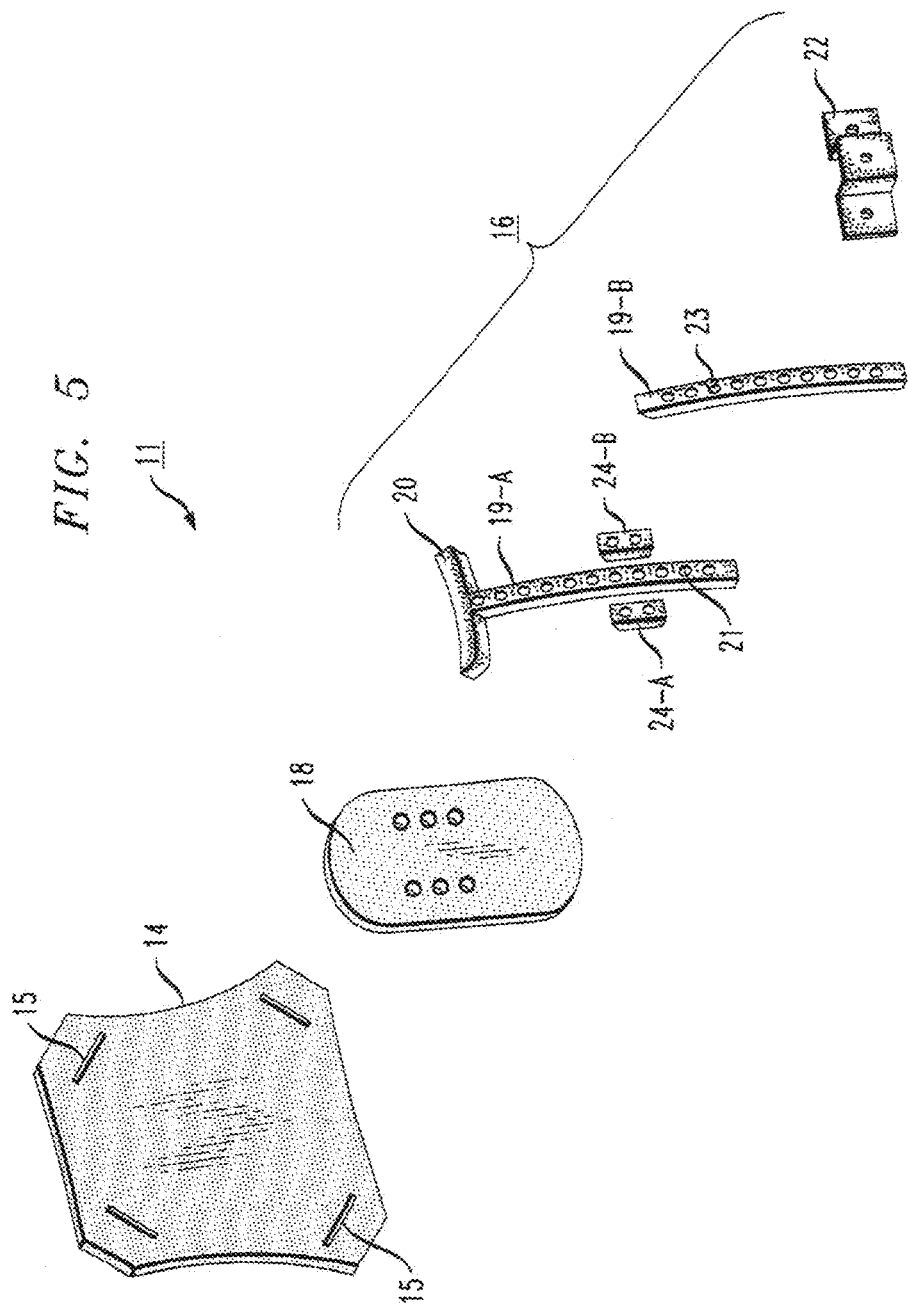

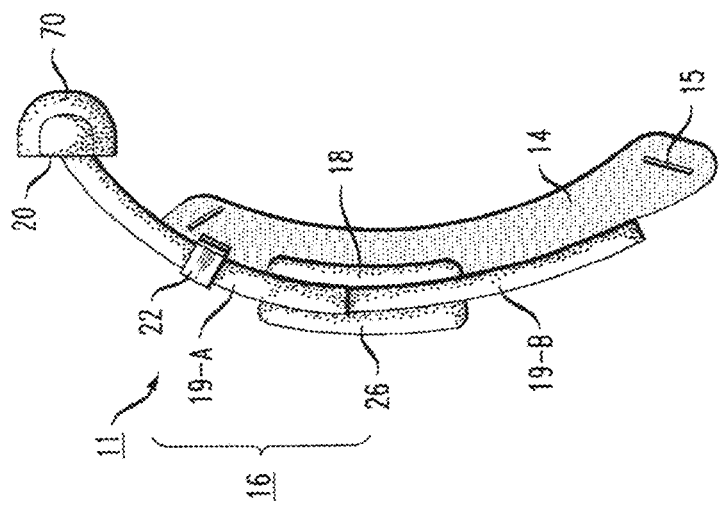
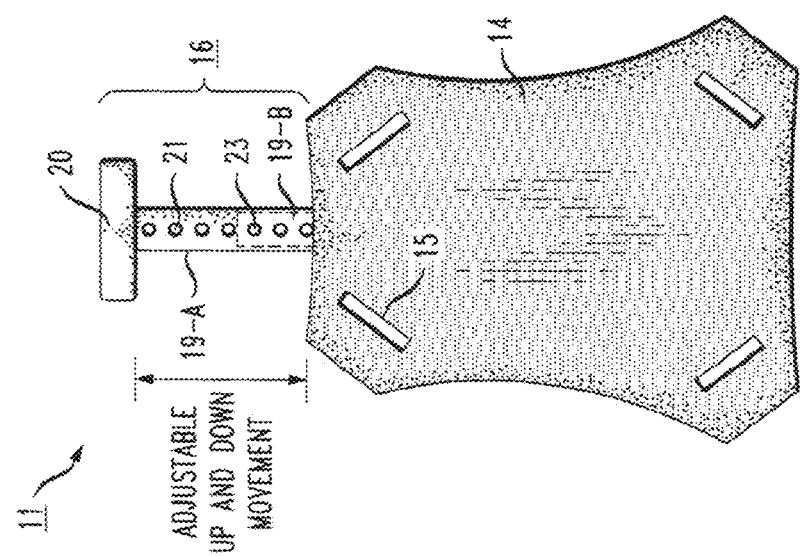

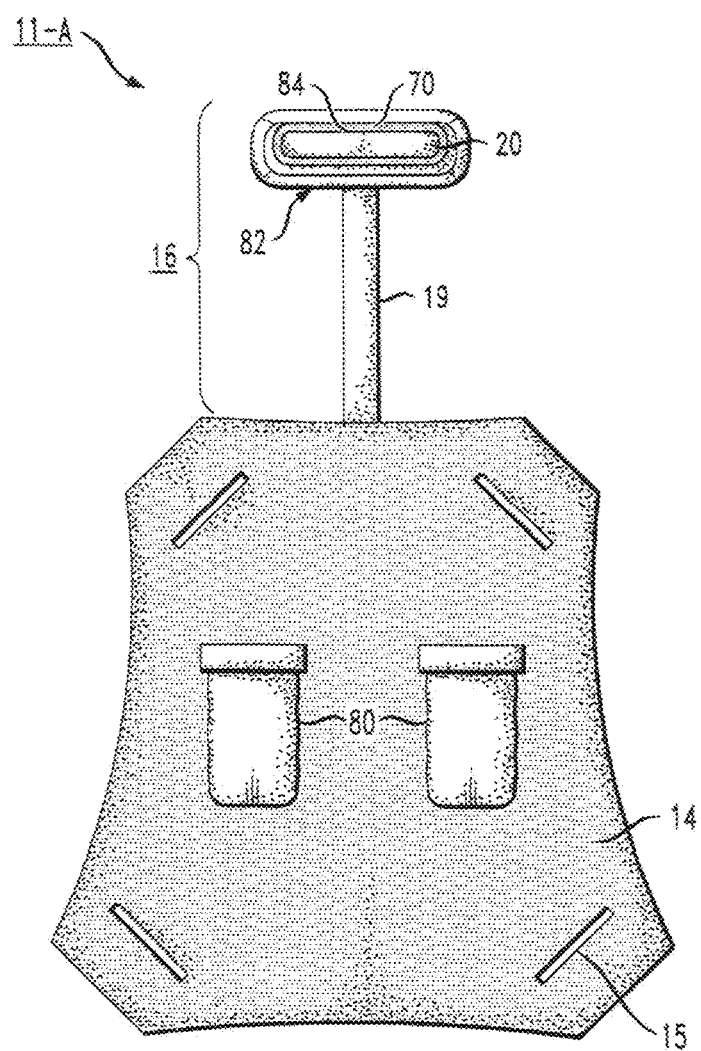

ADJUSTABLE BACK, NECK, AND HEAD SUPPORT FOR FALL ARREST HARNESS

CROSS-REFERENCE TO RELATED APPLICATIONS

This application claims the benefit of U.S. Provisional Application Ser. No. 62/404,451, filed Oct. 5, 2016 and herein incorporated by reference.

TECHNICAL FIELD

The present invention relates to support apparatus for wearable safety apparatus and, more particularly, to support apparatus for cushioning the head, neck and back in an adjustable manner.

BACKGROUND OF THE INVENTION

Persons who work in construction and/or maintenance of elevated structures such as buildings, scaffoldings, oil rigs, elevated pipelines, cell towers, telephone lines, wind turbines and the like (for example) are frequently at risk for inadvertent falls from these structures. Thus, such persons may be required to wear a safety harness that is designed to prevent a dangerous fall. One exemplary safety harness may comprise a combination of belts that criss-cross each other and are fastened around the torso, upper chest area, and waist (and possible the thigh area), with a lanyard that is attached to the back of the harness where these belts may cross each other.

Accordingly, in the event that the person inadvertently falls from the structure, the harness and lanyard support the person's weight and prevent the person from falling to the ground. Conventional safety harnesses may be constructed from tough materials such as nylon webbing, leather, or the like. The harness may include a "D" ring (or other fittings) that is secured at one end of the lanyard. The opposite (far) end of the lanyard may be connected to the elevated structure using a suitable coupling, well-known in the art. In some cases, the far end of the lanyard may be connected to stationary railing beams using additional rollers or pulleys, providing horizontal mobility to the user at the elevated level.

Until now, little thought or effort has gone into studying and understanding additional aspects of such a safety harness. For example, while a conventional fall arrest harness is functional for many jobs and trades, it lacks the proper back, neck, and head support for many applications. Additionally, if the harness is in fact used to prevent a fall to the ground, the person will experience a "fall" to some degree, with additional forces applied to his body (which may be serious and traumatic forces applied to the head, neck, and back area).

Additionally, many workers are constantly looking up, as in daily window washing and elevated painting operations. Tasks such as performing precision welds on elevated piping are known to severely stress an individual's back and neck muscles. Even welders working on ground-level piping experience these stresses when positioned somewhat underneath of piping and welding in a somewhat upward direction.

SUMMARY OF THE INVENTION

The needs remaining in the prior art are addressed by the present invention, which relates to support apparatus for wearable safety apparatus and, more particularly, to support apparatus for cushioning the head, neck and back in an adjustable manner.

The present invention relates to a safety harness used to aid in back, neck, and head support. The cushioning apparatus of the present invention can be added to most safety harnesses in use today. The cushioning apparatus provides safety and comfort benefits to the person wearing the harness, whether or not the person is tethered via a lanyard to an elevated location, or working at ground level at an awkward body position.

In accordance with the present invention, the support apparatus comprises a back (and perhaps shoulder) support pad, used in combination with an adjustable head and neck rest. The head rest may also be made to pivot forward and back. The neck rest is preferably attached to the back support pad via a support plate disposed on a rear surface of the back support pad.

One exemplary embodiment takes the form of cushioning apparatus for a safety harness comprising a back support pad and an adjustable neck and head support component attached to the back support pad. The adjustable neck and head support component itself includes a curved vertical neck support bar of adjustable length (connected at a fixed point to the back pad) and a curved head support attached to a distal end of the vertical neck support bar, where the combination of the vertical neck support bar and the curved head support form a T-shaped adjustable neck and head support component.

Other and further embodiments and aspects of the present invention will become evident during the course of the following discussion and by reference to the accompanying drawings.

BRIEF DESCRIPTION OF THE DRAWINGS

Referring now to the drawings, where like numerals represent like parts in several views:

FIG. 4 illustrates a safety harness including cushioning apparatus formed in accordance with one or more embodiments of the present invention;

FIG. 5 is an exploded view of the cushioning apparatus as shown in FIG. 4;

FIG. 6 is a front view of the cushioning apparatus of FIG. 4;

FIG. 7 is a side view of the configuration of FIG. 6

FIG. 8 illustrates an alternative embodiment of the present invention, particularly configured to include additional heating/cooling elements within the cushioning apparatus;

DETAILED DESCRIPTION

As will be discussed in detail below, the present invention is related to the addition of cushioning apparatus to a standard fall arrest harness or harness system. The cushioning apparatus comprises a back (and perhaps shoulder) support pad, along with an arched and adjustable neck support bar that provides "up" and "down" movement with respect to the back support pad. A head rest is connected to the neck support, so that as the neck support is adjusts, the person is able to best cradle his/her head in a proper position. In some embodiments of the present invention, the head rest can be made to pivot forward and backward, allowing an individual a further degree of freedom in moving the cushioning apparatus into the most comfortable position. Prior to describing the details of the present invention, the pertinent components of a conventional fall arrest harness will be described.

Figure 1:
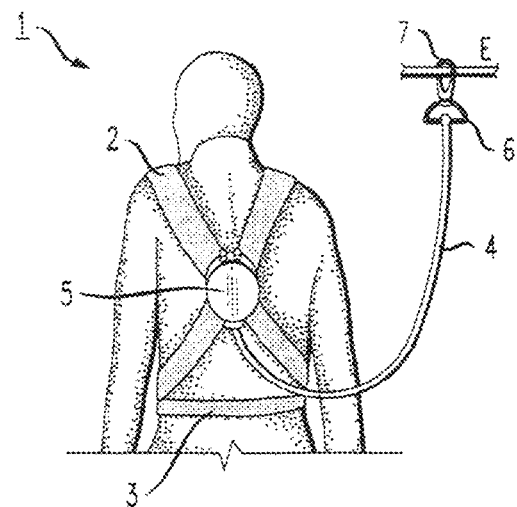
FIG. 1 illustrates a conventional, prior art safety harness.
Figure 2:
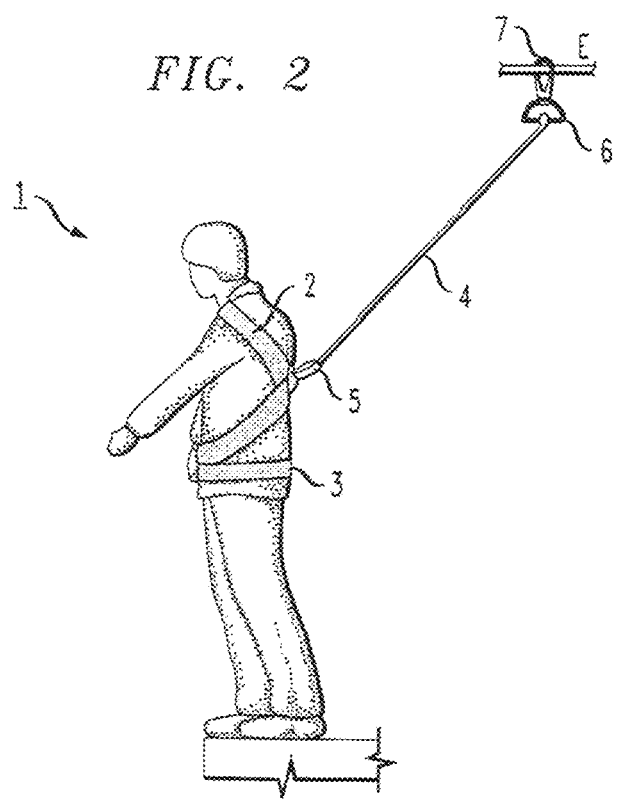
FIG. 2 is a side view of the harness of FIG. 1.

FIG. 1 illustrates a prior art fall arrest harness 1, comprising a pair of torso straps that criss-cross on the back of an individual and attach to a waist strap 3. A lanyard 4 is shown as connected between a lanyard housing 5 (attached to straps 2) and a D ring 6 (attached to a heavy-duty carabiner clip 7). Carabiner clip 7 is shown as attached to an elevated location E. FIG. 2 is a side view of the configuration of FIG. 1, illustrating how a person wearing fall arrest harness 1 may lean outward and away from an elevated location, but remain attached to the structure itself.

Figure 3:
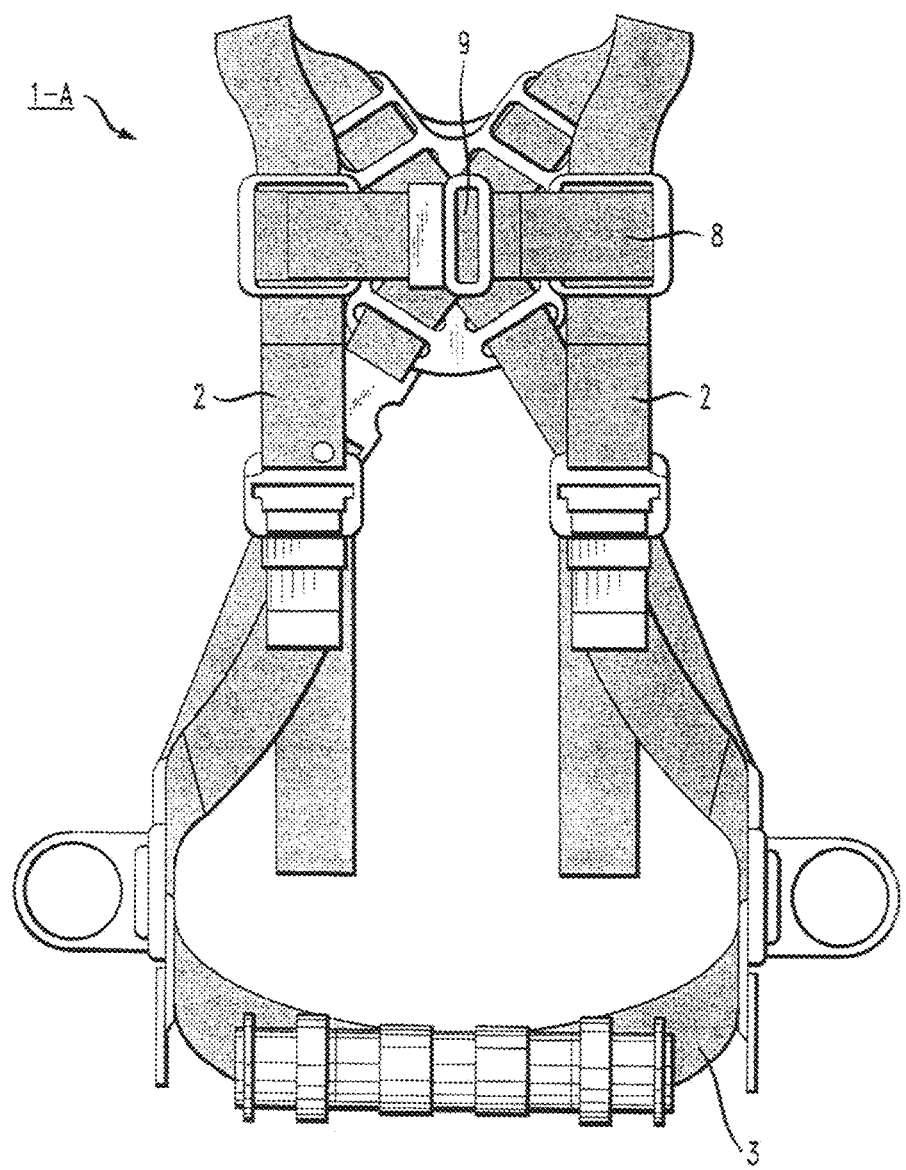
FIG. 3 is a view of an alternative prior art safety harness design, in this case including a horizontal safety strap attached between the pair of torso straps.

FIG. 3 illustrates a slightly different prior art fall arrest harness 1-A. Similar components as found in FIG. 1 contain the same reference numerals. Also shown in this FIG. 3 embodiment is a front strap 8 that is horizontally disposed across the user's chest, and is attached between torso straps 2. In most cases, front strap 8 is fixed in place using a buckle 9. The configuration of FIG. 3 is considered to offer more stability than the arrangement shown in FIG. 1.

FIG. 4 illustrates an exemplary fall arrest harness 10 formed to include a cushioning apparatus 11 formed in accordance with the present invention. FIG. 4 is a view from the rear of fall arrest harness 10. Similar to the prior art harnesses discussed above, harness 10 includes a pair of torso straps 12 that criss-cross over the spine area of the individual. In accordance with the teachings of the present invention, cushioning apparatus 11 comprises a back support pad 14 (of relatively rectangular form) which is formed to include a plurality of slots 15, one at each corner termination of pad 14. As shown in FIG. 4, torso straps 12 pass through diagonal pairs of slots 15, forming the illustrated "X" configuration. In a preferred embodiment, back support pad 14 comprises an ergonomic rubberized foam or gel. However, it is to be understood that any suitable foam, gel or molded lightweight and compressible material is suitable for use as this element.

Inventive cushioning apparatus 11 further comprises an adjustable neck and head support component 16, coupled to back support pad 14 via a bolt plate 18. Adjustable neck and head support component 16, as will be discussed in detail below, includes an adjustable, vertical neck support bar 19 and a curved head support 20 attached to an upper termination of vertical neck support bar 19, forming a somewhat T-shaped adjustable neck and head support component 16. Head support 20 itself may be formed of cushioned material, or may be covered by cushioned padding. Bolt plate 18 is attached to back support pad 14 via any suitable type of attachment, including but not limited to being screwed or bolted to the pad, or glued in place to the pad. A cross-brace element 22 is attached to bolt plate 18, where vertical neck support bar 19 is clamped down in place against bolt plate 18 by cross-brace element 22.

In accordance with the present invention, vertical neck support bar 19 is adjustable in length, as indicated by the "UP DOWN" arrow in FIG. 4. In the embodiment shown in FIG. 4, support bar 19 comprises a telescoping arrangement of a pair of separate support bar elements 19-A, and 19-B, where element 19-A includes a plurality of spaced-apart apertures 21 that mate with a spring-loaded pin element 23 formed in element 19-B. The user is therefore able to adjust the positioning of neck and head support component 16 such that head support 20 is properly positioned against the back of the head. Other vertical bar configurations, such as a tubular (i.e., cylindrical) bar may be used.

A rubber mold 26, shown as disposed in a central region of bolt plate 18, is a typical element of a conventional fall arrest safety harness used to guide the positioning of the torso straps. For the purposes of the present invention, mold 26 may be disposed over and attached to bolt plate 18 in the same region as in prior art arrangements.

Also shown in FIG. 4 is a waist strap 30, which may pass between back support pad 14 and bolt plate 18. A waist strap buckling configuration 32-A and 32-B is also shown in conjunction with waist strap 30.

FIG. 5 is an exploded view of an exemplary cushioning apparatus 11 of the present invention, suitable for use with a fall arrest harness, or any other type of safety harness. Shown in this view is back support pad 14, including the plurality of slots 15 formed in each corner area and used to allow the torso straps (not shown) to be threaded through back support pad 14 in a criss-cross manner. Bolt plate 18 is also shown in alignment with back support pad 14. Adjustable neck and head support component 16 is shown in this exploded view as including curved head support 20 and vertical neck support bar 19.

Evident in this view of FIG. 5 is the curved configuration of adjustable vertical neck support bar 19, where the curving is provided to mimic the natural line of the spine and provide complete support to the individual, thus minimizing back strain. In this particular embodiment, vertical neck support bar 19 is shown as the two separate elements 19-A and 19-B which engage in a known manner via apertures 21 and spring-loaded pin 23 to allow for a user to adjust the length of support bar 19. Cross-brace element 22 is also shown, and is used as discussed above to clamp vertical support bar 19 in place on bolt plate 18.

A pair of additional support members 24-A and 24-B is also shown in FIG. 5. It was found that in some cases conventional plastic mold 26 (as shown in FIG. 4) would tend to move back and forth in a rocking motion as a result of the arch in vertical support bar 19. It was found that by included a pair of cushioned support members 24-A and 24-B on either side of bar 19, a majority of the rocking motion could be dissipated. While considered a preferred embodiment in terms of adding strength and stability to inventive cushioning apparatus 11, support members 24 are not considered an essential element of the invention in its broadest scope.

FIG. 6 is a front view of inventive cushioning apparatus 11, which clearly shows the positioning of neck and head support component 16 with respect to back support pad 14. As with the other illustrations, the adjustable nature of neck support bar 19 is illustrated in the form of apertures 21 of bar element 19-A that engage with spring-loaded pin 23 in bar element 19-B. FIG. 7 is a side view of inventive cushioning apparatus 11, clearly depicting the curved form of vertical bar element 19. Also shown in this view is a separate head cushion 70 that may be used to cover curved head support 20. Both bolt plate 18 and rubber mold 26 are visible in this side view.

FIG. 8 illustrates an alternative embodiment of the present invention, referred to hereinafter as inventive cushioning apparatus 11-A. In this embodiment of the present invention, one or more pouches 80 are attached to an interior surface of back support pad 14 (i.e., the surface that contacts the user). These pouches may be used to encase heat packs or gel-cooling packs, as desired or necessary to increase longer comfortable working hours in all four seasons of the year. Also shown in FIG. 8 is a headrest cover 82 (which may be placed directly over head support bar 20, or head cushion 70, as the case may be) which includes a casing 84 in which to house similar heat or cool packs.

Figure 9:
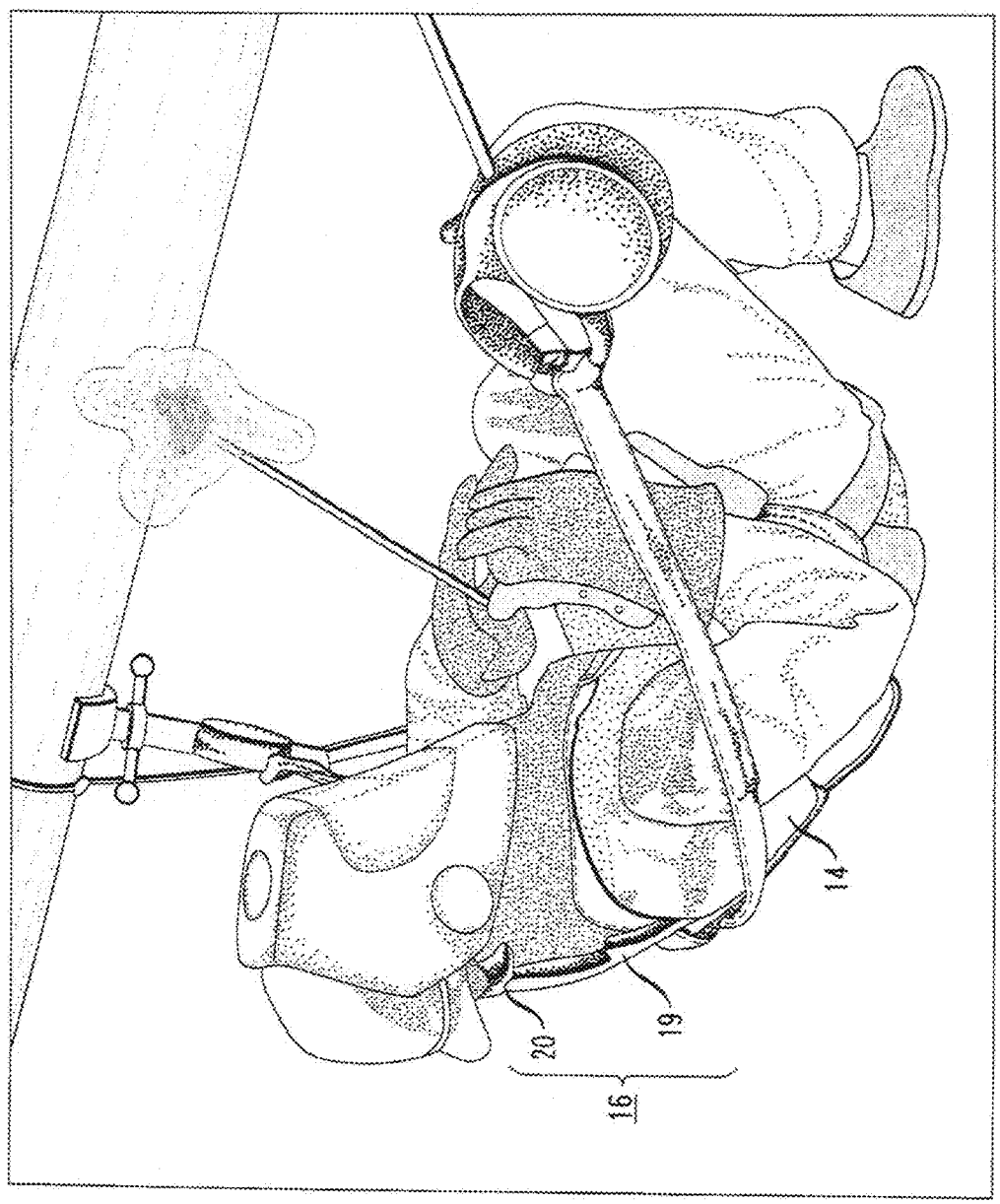
FIG. 9 depicts the use of a safety harness including the invention cushioning apparatus in a ground-level application.

FIG. 9 illustrates an exemplary use of a safety harness incorporating inventive cushioning apparatus 11 in a non-elevated situation; in this case, when working on precision welding of a ground level pipe. Here, it is clearly shown how the extra support supplied by neck and head support component 16, as well as the cushioning of back support pad 14 allows for an individual to perform a dangerous task (while being in an awkward position) with additional comfort. Indeed, the ability to support the body in this manner will lower fatigue levels and improve the quality of work that is performed, as well as the length of time that an individual may remain on task.

It is to be understood that the two above methods are not to be limited to any other added or substituted parts, methods or activated devices for support or control, to control the "up" and "down" adjustments of the pins on the arched inner & outer support bars or tubular shaped cylinders for the neck, & head. For example, anything in addition to a "telescoping or retractable" type of movement, etc., or anything other than spring loaded pins may be used.

Moreover, the present invention is not limited to in any other way of any types of materials listed or not listed for the construction or manufacturer of the adjustable back/neck and head support harness, for fall arrest harnesses or any other stand-alone type of back, waist, torso, or shoulder support harnesses; that offer support for the back, shoulder, neck and/or head. Whether it be used independently as a stand-alone harness or attached to any fall arrest harness, or harness system.

While various embodiments of the present invention have been described in detail above, it is to be understood that many changes and modifications in the above-described embodiments of the invention can, of course, be carried out without departing from the scope thereof. The materials used are not to be limited to any type, or color, or specific compositions (i.e., neoprene or any ergonomic-shaped soft or firm plastic support forms may be used). Accordingly, the scope of the present invention is intended to be limited only by the claims appended hereto and their equivalents.

What is claimed is:

1. A safety harness including
   a pair of torso straps disposed in a criss-cross configuration;
   a waist strap; and
   cushioning apparatus comprising:
     a back support pad including a plurality of slots for accepting the pair of torso straps; and
     an adjustable neck and head support component attached to the back support pad with the waist strap passing between the adjustable neck and head support component and the back support pad, the adjustable neck and head support component comprising
       a vertical neck support bar of adjustable length, curved along the length thereof and connected at a fixed point to the back support pad; and
       a curved head support attached to a distal end of the vertical neck support bar, wherein the combination of the vertical neck support bar and the curved head support forms the adjustable neck and head support component.

2. The safety harness as defined in claim 1 wherein the cushioning apparatus further comprises
   a bolt plate attached to the back support pad, wherein the vertical neck support bar also attaches to the bolt plate.

3. The safety harness as defined in claim 2 wherein the vertical neck support bar is attached to the bolt plate by a cross brace element.

4. The safety harness as defined in claim 1 wherein the plurality of slots are formed in proximity to a set of corner edge regions of the back support pad, the slots sized to accommodate the torso straps.

5. The safety harness as defined in claim 1 wherein the vertical neck support bar is curved in a manner to support a person's spine during use of the safety harness.

6. The safety harness as defined in claim 1 wherein the vertical neck support bar comprises a pair of telescoping bar elements, a first element formed to include a plurality of spaced-apart apertures and a second element formed to include a spring-loaded pin such that a length of the vertical neck support bar is adjusted by moving the first element relative to the second element, engaging the spring-loaded pin in a desired aperture for a predetermined length.

7. The safety harness as defined in claim 1 wherein the vertical neck support bar comprises a tubular component.

8. The safety harness as defined in claim 1 wherein the back support pad further comprises at least one pouch formed on an interior surface thereof, the at least one pouch utilized to allow for encasement of a hot/cold pack, as necessary.

9. The safety harness as defined in claim 1 wherein the curved head support further comprises a cushioned pad attached to an outer surface thereof.

10. The safety harness as defined in claim 1 wherein the curved head support further comprises a covering element including a pouch for holding a hot/cold pack.

11. The safety harness as defined in claim 1, wherein the safety harness comprises a fall arrest harness.

* * * * *